Oct. 23, 1923.
K. R. IHAMUOTILA
1,471,664
ELECTRICITY COUNTER
Filed Jan. 31, 1921
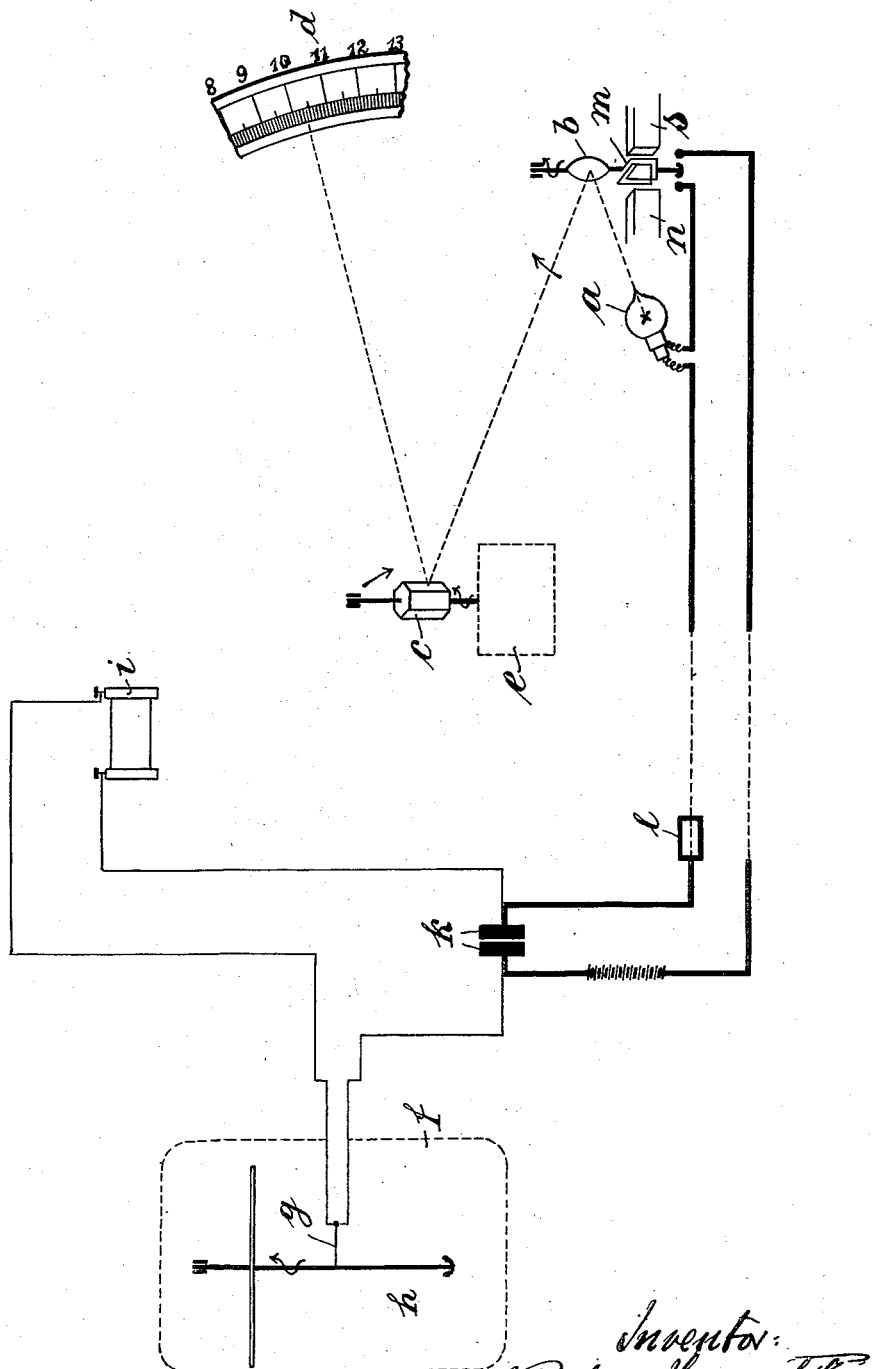

Patented Oct. 23, 1923.

1,471,664

UNITED STATES PATENT OFFICE.

KARL R. IHAMUOTILA, OF HELSINGFORS, FINLAND.

ELECTRICITY COUNTER.

Application filed January 31, 1921. Serial No. 441,461.

*To whom it may concern:*

Be it known that I, KARL RICHARD IHAMUOTILA, a citizen of Finland, residing at Helsingfors, Finland, have invented certain new and useful Improvements in Electricity Counters (for which I have filed application in Germany Jan. 3, 1919), of which the following is a specification.

My invention relates to testing apparatuses and more particularly apparatuses for testing electricity meters. The object of my invention is to produce a testing apparatus of this kind, whereby the testing operation may be greatly facilitated and the time for performing the test considerably shortened. My new apparatus is both simple in construction and operation.

On the accompanying drawing on which my apparatus is diagrammatically illustrated, the electricity meter to be tested is shown at $f$. On the axis $h$ of this meter I secure a contact arm $g$ which once during every revolution of the axis $h$ closes the electric circuit of an inductance coil $i$. In order to avoid friction, the point of the contact arm $g$ passes between the contacts of the said circuit without touching the same. However, every time the point of the contact arm $g$ passes between the said contacts, the electric circuit is closed by a spark transmitted by the point of the contact arm $g$ from one contact to the other. As the spark passes, the air in the narrow gap between the two carbon plates $k$ becomes conductive closing the electric circuit of a galvanometer $m$, which thereby receives an impulse. $n$ and $s$ are respectively the north and south pole of the magnetic field. On the axis of the galvanometer $m$ is mounted a mirror $b$ which upon every impulse received by the galvanometer $m$ is deflected so as to receive a ray of light from a lamp $a$. From the mirrow $b$ this ray of light is reflected upon a rotating mirror $c$ whereby, in turn, the ray of light is thrown onto a scale $d$. The miror $c$ is carried by the axis of a normal meter $e$, rotating with the angular velocity, which the meter to be tested is supposed to have under a predetermined load.

The ray of light reflected by the mirror $b$ onto the mirror $c$ and thrown by the latter onto the scale $d$ once during each revolution of the axis $h$ of the meter $f$ either will appear always on the same division mark of the scale $d$, in which case the meter $f$ runs normal, or will appear to the right or the left of the said mark according to whether the meter $f$ is too fast or too slow. This deviation, however slight, will be immediately indicated by the scale $d$.

It is, of course, not necessary that the mirrors $b$ and $c$ rotate at the same speed. It is sufficient, if the rotation of mirror $b$ bears some fixed relation to the rotation of miror $c$.

If the meter $e$ carrying the mirror $c$ runs at the definite rate of say one revolution per second, for instance, the period of time of each revolution of the meter $f$ to be tested can also be exactly determined up to a minute fraction of a second. The scale $d$ having a fixed length, the period of time of each revolution of the meter $f$ can readily be determined by the deviation of the light ray from the said division mark on the scale.

$l$ is a time-relay in the galvanometer circuit, for opening the same.

I claim as my invention:

1. Apparatus for testing electricity meters, and the like, comprising in combination with the rotatable axis of the said meter a contact arm mounted on said axis, an electric circuit, an inductance coil therein, two contacts in the said circuit with a spark gap between them adapted to be periodically bridged by the said contact arm to form a spark, a supplementary circuit adapted to be closed upon the said first mentioned circuit being closed by the spark, a galvanometer included in the said supplementary circuit, a source of light, a mirror carried by the said galvanometer and periodically deflected therewith, so as to receive a ray of light from the said source of light, a second mirror revolving at a constant predetermined rate of speed and arranged to receive a reflection of the said ray of light from the said first mentioned mirror, and a means for determining the position of the said ray of light as reflected from the said second mirror.

2. An apparatus as specified in claim 1, in which the second mirror is carried by the rotating axis of a normal meter running at a predetermined rate of speed.

3. An apparatus as specified in claim 1, in which the said source of light consists of an electric incandescent lamp included in the said supplementary electric circuit.

In testimony whereof I have affixed my signature in presence of two witnesses.

K. R. IHAMUOTILA.

Witnesses:
 K. A. KOSLINEN,
 O. TUOMINEN.